United States Patent
Tsai et al.

(10) Patent No.: US 8,649,655 B2
(45) Date of Patent: Feb. 11, 2014

(54) DISPLAY DEVICE WITH PLAYBACK FUNCTIONALITY, AND IMAGE INFORMATION PROCESSING METHOD THEREOF

(75) Inventors: Ming-Hsien Tsai, Taipei (TW); Po-Hsu Chen, Taipei (TW)

(73) Assignee: Wistron Corporation, Taipei Hsien (TW)

( * ) Notice: Subject to any disclaimer, the term of this patent is extended or adjusted under 35 U.S.C. 154(b) by 161 days.

(21) Appl. No.: 12/883,539

(22) Filed: Sep. 16, 2010

(65) Prior Publication Data
US 2011/0069933 A1   Mar. 24, 2011

(30) Foreign Application Priority Data

Sep. 18, 2009   (TW) ............................... 98131530 A

(51) Int. Cl.
| | | |
|---|---|---|
| *H04N 5/775* | (2006.01) | |
| *H04N 5/222* | (2006.01) | |
| *H04N 5/225* | (2006.01) | |
| *H04N 5/93* | (2006.01) | |
| *H04N 5/917* | (2006.01) | |
| *G06K 9/00* | (2006.01) | |

(52) U.S. Cl.
USPC ...... 386/230; 386/353; 386/355; 348/333.01; 348/333.13; 348/372; 382/128

(58) Field of Classification Search
USPC ............. 386/230, 353, 355, E5.002, E5.052, 386/E9.052; 382/128; 600/446; 348/333.01, 333.13, 372, E5.024, 348/E5.047
See application file for complete search history.

(56) References Cited

U.S. PATENT DOCUMENTS

| | | | | |
|---|---|---|---|---|
| 6,069,993 | A  * | 5/2000 | Kawara ......................... | 386/353 |
| 6,441,854 | B2 * | 8/2002 | Fellegara et al. ........ | 348/333.13 |
| 8,073,211 | B2 * | 12/2011 | Halmann ...................... | 382/128 |

FOREIGN PATENT DOCUMENTS

CN   200810081372.6   8/2008

OTHER PUBLICATIONS

Chinese Office Action; CN 200910177319.0 issued Dec. 2, 2011.

* cited by examiner

*Primary Examiner* — Thai Tran
*Assistant Examiner* — Syed Hasan
(74) *Attorney, Agent, or Firm* — Steptoe & Johnson LLP

(57) ABSTRACT

A display device with playback functionality includes: an image information extracting module for extracting image information from a storage medium, and processing the image information so as to generate and output a first setting image signal conforming with a specific format; an image processor for receiving the first setting image signal and performing picture quality processing so as to generate and output a second setting image signal conforming with the specific format; a display unit capable of receiving and displaying one of the first and second setting image signals conforming with the specific format; and a control unit for performing control such that the display unit receives one of the first and second setting image signals when a command is received, and the other of the first and second setting image signals when the command is not received.

10 Claims, 4 Drawing Sheets

DISPLAY DEVICE WITH PLAYBACK FUNCTIONALITY, AND IMAGE INFORMATION PROCESSING METHOD THEREOF

CROSS-REFERENCE TO RELATED APPLICATION

This application claims priority of Taiwanese application no. 098131530, filed on Sep. 18, 2009.

BACKGROUND OF THE INVENTION

1. Field of the Invention

The invention relates to a display device with playback functionality, more particularly to a display device with optical disk playback functionality.

2. Description of the Related Art

Referring to FIG. 1, a conventional display device 9 with optical disk playback functionality includes an interface unit 95, an image processor 91 (also known as a scaler), a DVD module 92, a display unit 93, and a control unit 94. The interface unit 95 is for receiving an external image signal from an external image source, and can be a component video connector, an AV connector, an HDMI connector, etc. The image processor 91 is for performing picture quality (PQ) processing on an image signal that is received from either the interface unit 95 or the DVD module 92, and adjusting a resolution and converting a color gamut base of the image signal so that the image signal conforms with a specific format of an image signal that the display unit 93 is capable of receiving and displaying. The picture quality processing performed by the image processor 91 produces an image signal with a comparatively higher degree of color saturation and picture quality.

Although the DVD module 92 has signal processing capabilities that enable output of the image signal conforming with the specific format required by the display unit 93, and the picture quality processing is not always desirable, the conventional display device 9 with optical disk playback functionality does not enable the display unit 93 to receive the image signal directly from the DVD module 94. Instead, the image signal from the DVD module 94 must be processed by the image processor 91 before being outputted to the display unit 93. Therefore, the image processor 91 is activated regardless of whether the image signal is received from the DVD module 92 or the interface unit 95. Such activation of the image processor 91 results in unnecessary power consumption and a waiting period pending activation of the image processor 91.

SUMMARY OF THE INVENTION

Therefore, the main object of the present invention is to provide a display device with playback functionality that can reproduce image information without activating an image processor thereof.

According to the present invention, there is provided a display device with playback functionality. The display device is adapted for reproducing image information recorded in a storage medium, and comprises an image information extracting module, an image processor, a display unit, and a control unit. The image information extracting module is for extracting the image information from the storage medium, and processing the image information so as to generate and output a first setting image signal that conforms with a specific format. The image processor is coupled electrically to the image information extracting module far receiving the first setting image signal and performing picture quality processing on the first setting image signal so as to generate and output a second setting image signal that conforms with the specific format. The display unit is coupled electrically and respectively to the image processor and the image information extracting module, and is capable of receiving and displaying image signals conforming with the specific format. The control unit is coupled electrically to the image processor, is adapted for receiving a command, and is for performing control such that the display unit receives the first setting image signals from the image information extracting module and display or receives the second setting image signals from the image processor and display.

Preferably, the image information extracting module is an optical disk playback module for extracting the image information from an optical disk.

Preferably, when the control unit performs control such that the display unit receives the first setting image signal from the image information extracting module, the control unit deactivates the image processor, and when the control unit receives a picture quality activation command, the control unit activates the image processor, and then performs control such that the display unit receives the second setting image signal from the image processor. The advantage of this invention resides in enabling the display unit to receive the image signal directly from the image information extracting module so that the image processor can be deactivated.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENT

Figure 1:
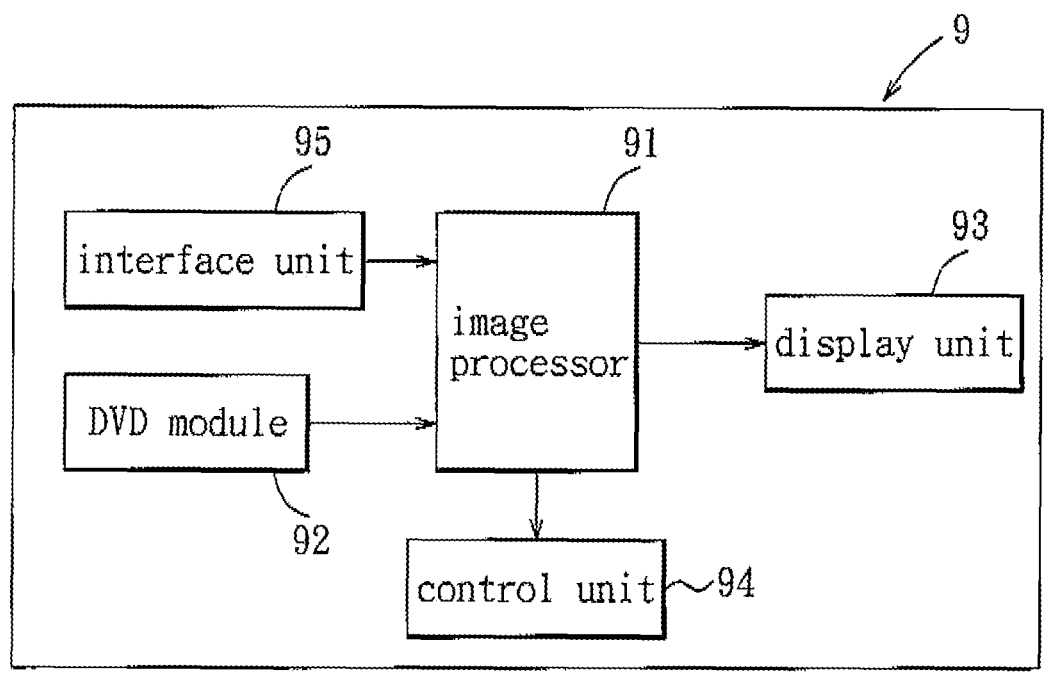
FIG. 1 is a schematic circuit block diagram of a conventional display device with optical disk playback functionality.
Figure 2:
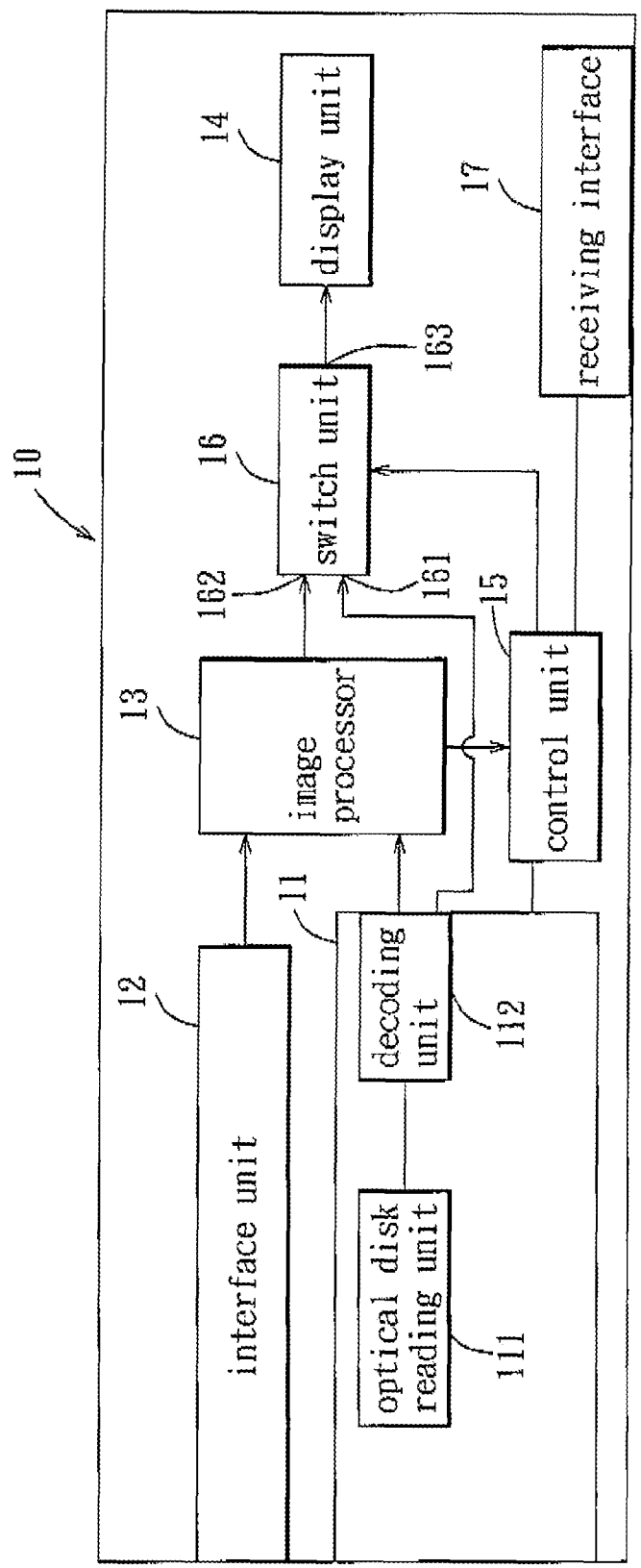
FIG. 2 is a schematic circuit block diagram of the preferred embodiment of a display device with playback functionality according to the present invention.

FIG. 2 illustrates the preferred embodiment of a display device 10 with playback functionality according to the present invention. The display device 10 is adapted for reproducing image information recorded in a storage medium, and comprises an image information extracting module 11, an image processor (or scaler) 13, an interface unit 12, a display unit 14, a control unit 15, a switch unit 16, and a receiving interface 17. It should be noted that the display unit 14 of this embodiment only recognizes image signals with certain signal specifications, and includes a display panel (not shown) with a native resolution and color gamut base. Therefore, the display unit 14 is capable of receiving and displaying only the image signals conforming with a specific format, that is, conforming with the signal specifications of the display unit 14 and the native resolution and color gamut base of the display panel.

The image information extracting module 11 is for extracting the image information from the storage medium, and processing the image information so as to generate and output a first setting image signal that conforms with the specific format of an image signal that the display unit 14 is capable of receiving and displaying. In this embodiment, the storage medium is a DVD, and the image information extracting module 11 is a DVD module in which the DVD is to be placed. The image information extracting module 11 includes an optical disk reading unit 111 and a decoding unit 112 coupled electrically to the optical disk reading unit 111. The optical disk reading unit 111 reads the image information from the DVD. The decoding unit 112 adjusts a resolution of the image information and converts a color gamut base of the image information so as to generate the first setting image signal conforming with the specific format. It should be noted that, the image information extracting module 11 is not limited to a DVD module, and can be another module that is capable of extracting image information from another type of storage medium, such as a VCD module, a USB socket, a memory card reader, etc.

The image processor 13 is coupled electrically to the image information extracting module 11 for receiving the first setting image signal and performing picture quality processing on the first setting image signal so as to generate and output a second setting image signal that conforms with the specific format. In this embodiment, an interface unit 12 is coupled electrically to the image processor 13. The interface unit 12 of this embodiment is a connector for receiving an external image signal that is outputted from an external audio-video playback device (not shown). In this embodiment, the interface unit 12 is a HDMI interface. However, the interface unit 12 can be another unit providing external audio-visual signal reception, such as a video component connector, an AV connector, a VGA port, etc.

The image processor 13 of this embodiment is accordingly operable to receive either the external image signal from the interface unit 12 or the first setting image signal from the image information extracting module 11. When the image processor 13 is operated to receive the external image signal, the image processor 13 performs picture quality processing on the external image signal, and adjusts a resolution of the external image signal and converts a color gamut base of the external image signal so as to generate and output the second setting image signal that conforms with the specific format.

The control unit 15, which is coupled electrically to the image processor 13, is adapted for receiving a command, and performs control such that the display unit 14 receives one of the first and second setting image signals when the command is received, and such that the display unit 14 receives the other of the first and second setting image signals when the command is not received. In this embodiment, the command is a picture quality activation command. When the control unit 15 does not receive the picture quality activation command, the control unit 15 deactivates the image processor 13 and performs control such that the display unit 14 receives the first setting image signal from the image information extracting module 11. When the control unit 15 receives the picture quality activation command, the control unit 15 activates the image processor 13 and performs control such that the display unit 14 receives the second setting image signal from the image processor 13.

The switch unit 16 is preferably a multiplexer coupled electrically to the control unit 15, and has a first input end 161 coupled electrically to the image information extracting module 11, a second input end 162 coupled electrically to the image processor 13, and an output end 163 coupled electrically to the display unit 14. When the control unit 15 receives the picture quality activation command, the control unit 15 controls the switch unit 16 such that the output end 163 of the switch unit 16 is switched from outputting the first setting image signal that is received by the first input end 161 to outputting the second setting image signal that is received by the second input end 162.

The receiving interface 17 is preferably a keyboard coupled electrically to the control unit 15 for receiving at least one keystroke for generating the picture quality activation command. The receiving interface 17 thus enables a user to activate picture quality processing by pressing a key (not shown).

Figure 3:
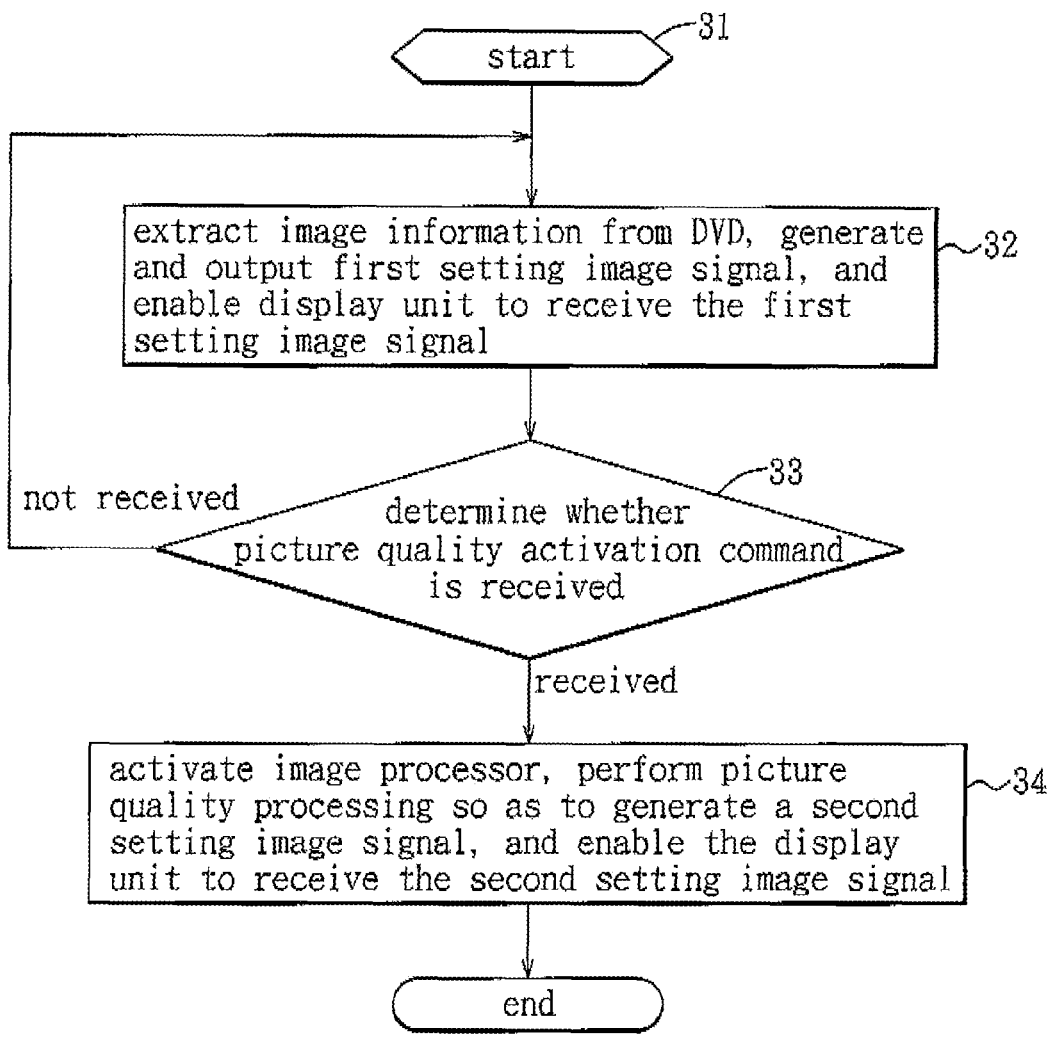
FIG. 3 is a flowchart of the preferred embodiment of an image information processing method according to the present invention, illustrating activation of an image processor of the display device.

Referring to FIGS. 2 and 3, the preferred embodiment of an image information processing method according to the present invention comprises the following steps. It should be noted that in this embodiment, the image processor 13 is initially in a deactivated state.

In step 31, the control unit 15 activates a portion of circuits of the display device 10 excluding the image processor 13 after detecting through the image information extracting module 11 placement of the DVD in a DVD tray (not shown) of the display device 10.

In step 32, the optical disk reading unit 111 of the image information extracting module 11 reads the image information from the DVD, and the decoding unit 112 adjusts a resolution of the image information and converts a color gamut base of the image information so as to generate the first setting image signal conforming with the specific format. At the same time, the control unit 15 controls the switch unit 16 such that the output end 163 of the switch unit 16 outputs the first setting image signal received by the first input end 161 to the display unit 14 for display. The flow then proceeds to step 33.

In step 33, the control unit 15 determines whether the picture quality activation command is received. When it is determined that the command is received, the flow proceeds to step 34. Otherwise, the flow returns to step 32.

Since the control unit 15 enables the display unit 14 to receive the image signal directly from the image information extracting module 11, a waiting period pending activation of the image processor 13 is eliminated, power utilized for activating the image processor 13 is saved, and a start-up time of the display device 10 is reduced. It should be noted, however, that the image information that is displayed by the display unit 14 has not undergone picture quality processing, which is only performed by the image processor 13.

In step 34, when it is determined that the picture quality activation command has been received, the control unit 15 activates the image processor 13 for receiving the first setting image signal from the image information extracting module 11 and performing picture quality processing on the first setting image signal so as to generate the second setting image signal. At the same time, the control unit 15 controls the switch unit 16 such that the output end 163 of the switch unit 16 is switched from outputting the first setting image signal that is received by the first input end 161 to outputting the second setting image signal that is received by the second input end 162. The display unit 14 then receives and displays the second setting image signal. Upon completion of step 34, the display unit 14 displays the image information from the DVD that has undergone picture quality processing by the image processor 13, and that consequently has a higher picture quality when compared with the image information that is displayed by the display unit 14 based on the first setting image signal.

Figure 4:
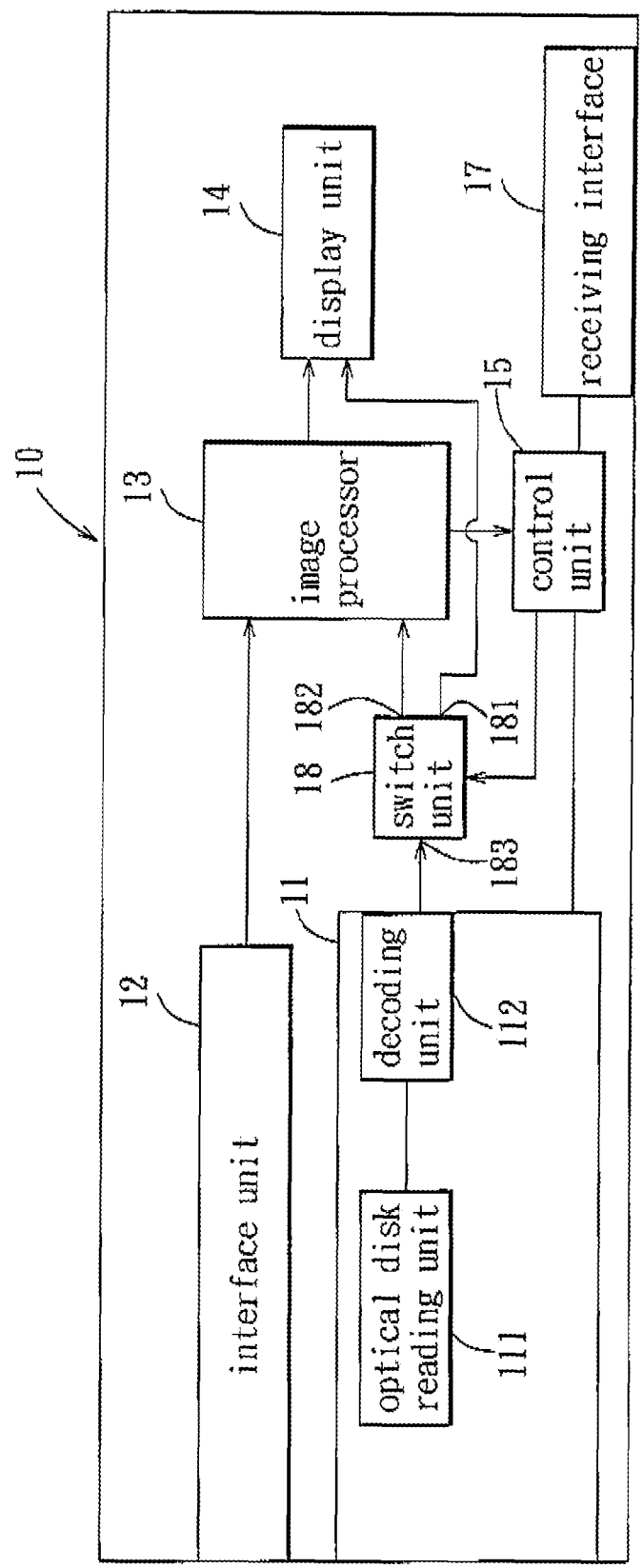
FIG. 4 is a schematic circuit block diagram of a modification of the preferred embodiment of a display device.

Although in this embodiment the switch unit 16 is a multiplexer having two input ends 161, 162 and an output end 163, the switch unit 16 can be a de-multiplexer disposed between the image processor 13 and the image information extracting module 11, and having an input end 183 and two output ends 181, 182 as shown in FIG. 4. In this case, the switch unit 18 can be switched from outputting through the first output end 181 the first setting image signal that is received by the input end 183 to outputting through the second output end 182 the first setting image signal that is received by the input end 183. When the first setting image signal is outputted through the first output end 181, the display unit 14 receives the first setting image signal. When the first setting image signal is outputted through the second output end 182, the display unit 14 receives the second setting image signal. A circuit designer can determine whether it is suitable to implement the switch unit as the multiplexer shown in FIG. 2 or as the de-multiplexer shown in FIG. 4, or to enable the control unit 15 to control the display unit 14 such that the display unit 14 displays one of the first and second setting image signals that are received thereby.

In summary, since the display unit 14 is able to receive the first setting image signal directly from the image information extracting module 11, a waiting period pending activation of the image processor 13 can be eliminated, power utilized for activating the image processor 13 can be saved, and a start-up time of the display device 10 can be reduced. However, when the picture quality processing is desired, the image processor 13 can be activated to perform picture quality processing on the first setting image signal so as to generate the second setting image signal with comparatively higher picture quality, and the display unit 14 is able to receive the second setting image signal from the image processor 13.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A display device with playback functionality, adapted for reproducing image information recorded in a storage medium, said display device comprising:
    an image information extracting module for extracting the image information from the storage medium, and processing the image information so as to generate and output a first setting image signal that conforms with a specific format;
    an image processor coupled electrically to said image information extracting module for receiving said first setting image signal and performing picture quality processing on said first setting image signal so as to generate and output a second setting image signal that conforms with said specific format;
    a display unit coupled electrically and respectively to said image processor and said image information extracting module, and capable of receiving and displaying one of said first and second setting image signals conforming with said specific format; and
    a control unit coupled electrically to said image processor and adapted for receiving a command, for performing control such that said display unit receives one of said first and second setting image signals directly when said command is received, and such that said display unit receives the other of said first and second setting image signals when said command is not received;
    wherein said command is a picture quality activation command;
    wherein, when said control unit does not receive said picture quality activation command, said control unit deactivates said image processor and performs control to enable said display unit to receive said first setting image signal from said image information extracting module, and when said control unit receives said picture quality activation command, said control unit activates said image processor and performs control to enable said display unit to receive said second setting image signal from said image processor;
    wherein a waiting period pending activation of said image processor is eliminated; and
    wherein power utilized for activating said image processor is saved and a start-up time of said display device is reduced.

2. The display device with playback functionality as claimed in claim 1, wherein the storage medium is an optical disk, and said image information extracting module extracts the image information from the optical disk and decodes the image information.

3. The display device with playback functionality as claimed in claim 2, wherein said image information extracting module includes:
    an optical disk reading unit for reading the image information from the optical disk; and
    a decoding unit coupled electrically to said optical disk reading unit for adjusting a resolution of the image information and converting a color gamut base of the image information so as to generate said first setting image signal conforming with a resolution of said display unit.

4. The display device with playback functionality as claimed in claim 1, further comprising
    a switch unit coupled electrically to said control unit, said switch unit having a first input end coupled electrically to said image information extracting module, a second input end coupled electrically to said image processor, and an output end coupled electrically to said display unit,
    wherein, when said control unit receives said picture quality activation command, said control unit controls said switch unit such that said output end of said switch unit is switched from outputting said first setting image signal that is received by said first input end to outputting said second setting image signal that is received by said second input end.

5. The display device with playback functionality as claimed in claim 4, wherein said switch unit is a multiplexer that accepts control from said control unit.

6. The display device with playback functionality as claimed in claim 1, further comprising
    a switch unit coupled electrically to said control unit, said switch unit having an input end coupled electrically to said image information extracting module, a first output end coupled electrically to said display unit, and a second output end coupled electrically to said image processor,
    wherein, when said control unit receives said picture quality activation command, said control unit controls said switch unit such that said switch unit switches from outputting through said first output end said first setting image signal that is received by said input end to outputting through said second output end said first setting image signal that is received by said input end.

7. The display device with playback functionality as claimed in claim 6, wherein said switch unit is a de-multiplexer that accepts control from said control unit.

8. The display device with playback functionality as claimed in claim 1, further comprising
- an interface unit coupled electrically to said image processor, through which said image processor receives an external image signal from an external image source,
- wherein said image processor is operable to receive one of the external image signal from said interface unit and said first setting image signal from said image information extracting module, and when said image processor is operated to receive the external image signal, said image processor adjusts a resolution of the external image signal to conform with a resolution of said display unit and performs picture quality processing on the external image signal so as to generate and output said second setting image signal that conforms with said specific format and that said display unit is capable of receiving and displaying.

9. An image information processing method adapted for reproducing image information on a display unit capable of receiving and displaying an image signal conforming with a specific format, the image information being recorded in a storage medium, said image information processing method comprising the steps of:
 (a) extracting the image information from the storage medium and processing the image information so as to generate a first setting image signal conforming with the specific format;
 (b) determining whether a picture quality activation command is received, proceeding to step (d) when it is determined that the picture quality activation command is received, and proceeding to step (c) when it is determined that the picture quality activation command is not received;
 (c) enabling the display unit to receive the first setting image signal, wherein a waiting period pending activation of an image processor is eliminated, and wherein power utilized for activating said image processor is saved and a start-up time of said display unit is reduced; and
 (d) performing picture quality processing on the first setting image signal so as to generate a second setting image signal conforming with the specific format, and enabling the display unit to receive the second setting image signal.

10. The image information processing method as claimed in claim 9, wherein the storage medium is an optical disk, and step (a) includes the sub-steps of:
 (a-1) reading the image information from the optical disk; and
 (a-2) adjusting a resolution of the image information and converting a color gamut base of the image information so as to generate the first setting image signal conforming with the specific format.

* * * * *